United States Patent
Wang et al.

(10) Patent No.: US 7,830,754 B2
(45) Date of Patent: Nov. 9, 2010

(54) OPTICAL DISC DRIVE CAPABLE OF PLAYING FAST ROLLING MUSIC USING FIRST AND SECOND BUFFERS

(75) Inventors: Chih-Wei Wang, Taipei (TW); Yuan-Yu Chan, Taipei (TW)

(73) Assignee: ALI Corporation, Taipei (TW)

( * ) Notice: Subject to any disclaimer, the term of this patent is extended or adjusted under 35 U.S.C. 154(b) by 461 days.

(21) Appl. No.: 11/947,811

(22) Filed: Nov. 30, 2007

(65) Prior Publication Data

US 2009/0141607 A1    Jun. 4, 2009

(51) Int. Cl.
*G11B 21/08*    (2006.01)

(52) U.S. Cl. .................. 369/30.23; 369/47.33

(58) Field of Classification Search ............. 369/30.23, 369/30.24, 30.18, 47.32–47.34; 711/111, 711/112, 113, 118, 4, 5; 386/125, 126
See application file for complete search history.

(56) References Cited

U.S. PATENT DOCUMENTS 6,131,138 A * 10/2000 Packer et al. ................. 711/4
6,832,041 B1 * 12/2004 Boyle ........................ 386/125
7,111,093 B2 * 9/2006 Navada et al. ............... 710/53
7,133,600 B1 * 11/2006 Boyle ........................ 386/125

* cited by examiner

*Primary Examiner*—Tan X Dinh
(74) *Attorney, Agent, or Firm*—Thomas, Kayden, Horstemeyer & Risley, LLP

(57) ABSTRACT

A method for playing a fast rolling music disc is provided. A music disc is read at an accelerated rate and played at a standard rate by discretely buffering data blocks into a ping pong buffer. Playing of a first data block stored in the first buffer, and buffering of a second data block into the second buffer are concurrently executed. When the playing of the first data block is concluded, the playing order of the first buffer and the second buffer are interchanged, and the concurrent playing and buffering step is repeated. Such that the second data block is played in the second buffer while a third data block is buffered into the first buffer. Discreteness between the second data block and the first data block is dependent on a skipping ratio, and the skipping ratio is dependent on the accelerated rate.

14 Claims, 8 Drawing Sheets

OPTICAL DISC DRIVE CAPABLE OF PLAYING FAST ROLLING MUSIC USING FIRST AND SECOND BUFFERS

BACKGROUND OF THE INVENTION

1. Field of the Invention

The invention relates to an optical disc drive, and in particular, to a buffer management method for playing a fast rolling music disc.

2. Description of the Related Art

Conventionally, an optical disc drive can be enabled to decode and play compressed music files from an optical disc. A fast rolling function including fast forwarding and fast rewinding allows users to rapidly search desired parts in the optical disc. The CPU employed in the optical disc drive is typically a low-end one so that costs and power consumptions can be lower. Conventionally, when fast rolling is initiated, the optical disc is rotated at an accelerated rate, and music that may be playing is interrupted. In efforts to avoid interruption of music play, some known technologies have been proposed to raise the decoding rate, such that a music file is played at a higher rate synchronous to the optical disc rotation. However, this approach is not feasible because the CPU and decoder may not be sufficient enough to handle high speed data processing. In addition, increasing the decoding rate induces higher power consumption, and music played at a higher rate usually sounds like insignificant noise, rendering unacceptable sound quality. Thus, the optical disc drive capable of uninterrupted music play in a fast rolling mode, with satisfactory music quality, and an enhanced method thereof is desirable.

BRIEF SUMMARY OF THE INVENTION

An exemplary embodiment of a method for playing a fast rolling music disc is provided. A music disc is read at an accelerated rate, and data blocks therein are discretely read and buffered in a first buffer and a second buffer in a ping pong buffer. Playing of a first data block stored in the first buffer, and buffering of a second data block into the second buffer are concurrently executed. When the playing of the first data block is concluded, the playing order of the first buffer and the second buffer are interchanged, and the concurrent playing and buffering step is repeated. Such that the second data block is played in the second buffer while a third data block is buffered into the first buffer. Discreteness between the first and second data blocks is dependent on a skipping ratio, and the skipping ratio is dependent on how fast the music disc is fast rolled.

Before buffering the second data block, a target sector of a target track where the third data block is located, is determined. The third data block, which is buffered concurrently while the second data block is played, has a distance from the second data block dependent on the skipping ratio.

A worst required time is then estimated, which allows complete buffering of the third data block, based on the distance, the target track, the target sector and the accelerated rate. A block size of the second data block is allocated based on the worst required time, providing complete playback duration which is subsequently longer than the worst required time.

Data blocks in the music disc may be compressed media encoded at a bit rate, and the block size of the second data block is related to multiplication of the playback duration and the bit rate.

To determine the worst required time, time required for the seeking operation of the target track is estimated. An average sector time based on the accelerated rate is calculated, wherein the average sector time is the time that is required by a PUH to move through a sector. A weighted sector time is calculated by weighting the average sector time with the ratio of the target track versus the total tracks on the music disc. Time to locate the target sector is calculated based on the weighted sector time.

While the second data block is played in the second buffer, buffering of the third data block comprises seeking of the target track and locating the target sector, and reading the third data block into the first buffer.

The fast rolling music disc may be in a fast forward mode, with the first, second and third data blocks in ascending order. Alternatively, the fast rolling music disc may be in a fast rewind mode, with the first, second and third data blocks in descending order. When playing the data blocks, the data blocks are decoded into audio signals and output for amplification.

Another embodiment provides an optical disc drive implementing the method for playing a fast rolling music disc. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is one of the best-contemplated modes of carrying out the invention. This description is made for the purpose of illustrating the general principles of the invention and should not be taken in a limiting sense. The scope of the invention is best determined by reference to the appended claims.

Figure 1:
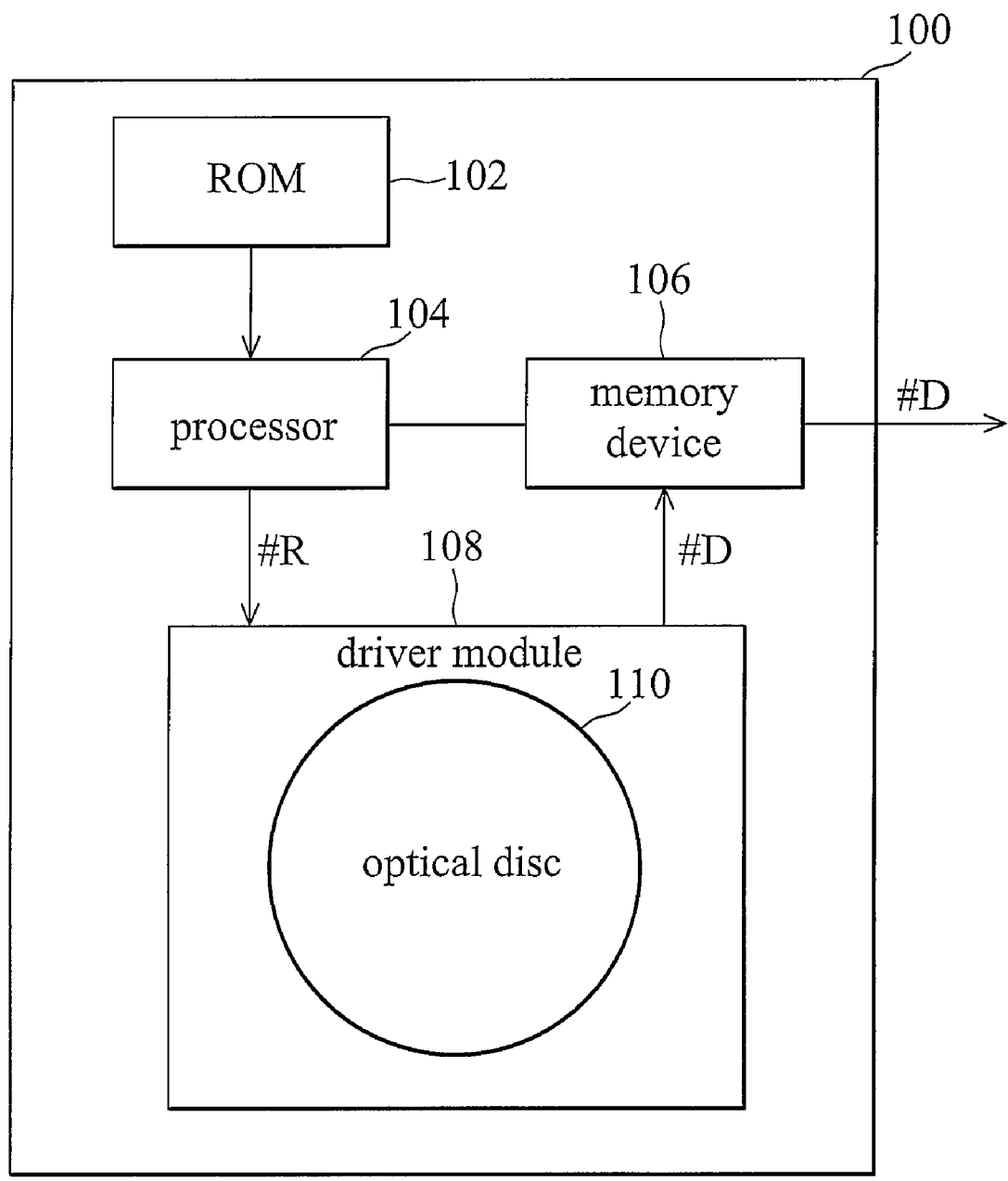
FIG. 1 shows an optical disc drive with an optical disc installed.

FIG. 1 shows an optical disc drive with an optical disc installed. The invention is particularly adaptable to an optical disc drive 100 of a low-end CPU because the method features efficient buffer utilizations that render high performances with limited hardware. The driver module 108 comprises mechanical elements such as pickup head (PUH) and servo controllers to access a disc. In normal mode, the driver module 108 reads the music disc consecutively and music is played at a normal rate (1×). When fast rolling is initiated, data blocks in the music disc are discretely acquired, and the music play is still proceeded at a standard rate (1X). Generally, music is read at an accelerated rate, and the accelerated rate is typically a multiple of the standard rate, ranging from 2×, 4×, 8× or even up to 52× depending on different standards, where X indicates the multiplicity. A memory device 106 comprises a ping buffer 210 and a pong buffer 220, whereby the data blocks read from the music disc are stored. The embodiment is particularly effective when a low-end processor such as a 8051 chip is used, however, the processor 104 is not limited to be a low-end processor. A firmware programmed in a read only memory (ROM) 102 is executed by the processor 104 to provide quality music play while in fast rolling mode.

Specifically, the processor 104 sends a read command #R to the driver module 108, and in response, the driver module 108 reads data blocks #D from the optical disc 110 and then buffers in the memory device 106. The memory device 106 then uses a ping-pong mechanism to output the data blocks #D. In this embodiment, the optical disc 110 is a music disc comprising files encoded in compressed media formats, MP3 or WMA for example. Alternatively, an uncompressed audio file such as a CD audio track may also be adaptable in the embodiment.

Figure 2A:
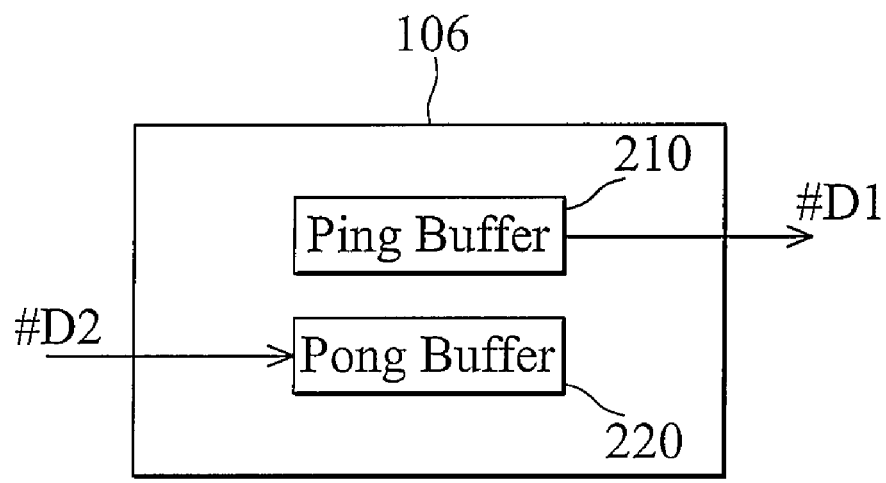
FIGS. 2a and 2b show a memory device comprising a ping buffer and a pong buffer.
Figure 2B:
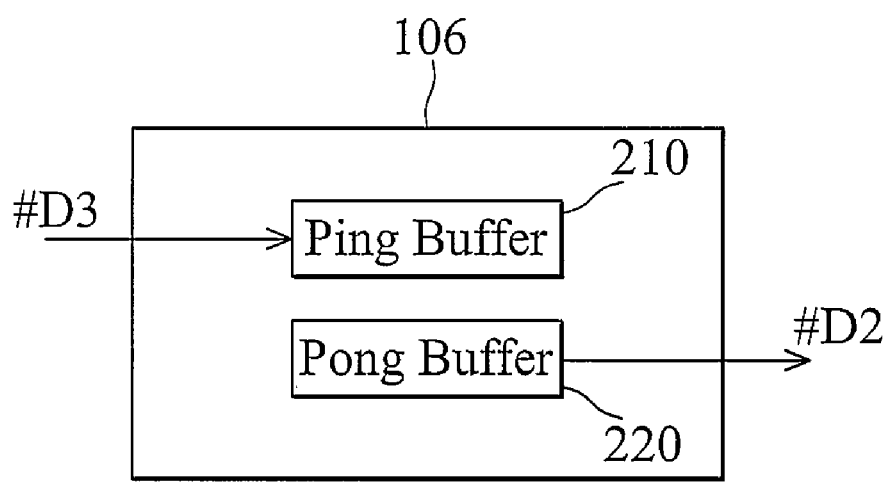

FIGS. 2a and 2b show a memory device comprising a ping buffer and a pong buffer. In FIG. 2a, a ping buffer 210 and a pong buffer 220 operate concurrently. The ping buffer 210 outputs a data block #D1 for play, and simultaneously, the pong buffer 220 receives a data block #D2 from the optical disc 110. In this case, the ping buffer 210 is referred to as a foreground buffer, whereas the pong buffer 220 is a background buffer. When data blocks in the ping buffer 210 are completely output, the places of the ping buffer 210 and pong buffer 220 are interchanged. The ping buffer 210 becomes a background buffer whereas the pong buffer 220 a foreground buffer. The case is as shown in FIG. 2b, wherein the ping buffer 210 buffers receives a data block #D3 from the optical disc 110 while the data block #D2 previously buffered in the pong buffer 220 is output for play. Likewise, when data blocks in the pong buffer 220 are completely output, their places interchange again, and the aforementioned process is repeated.

Figure 3:
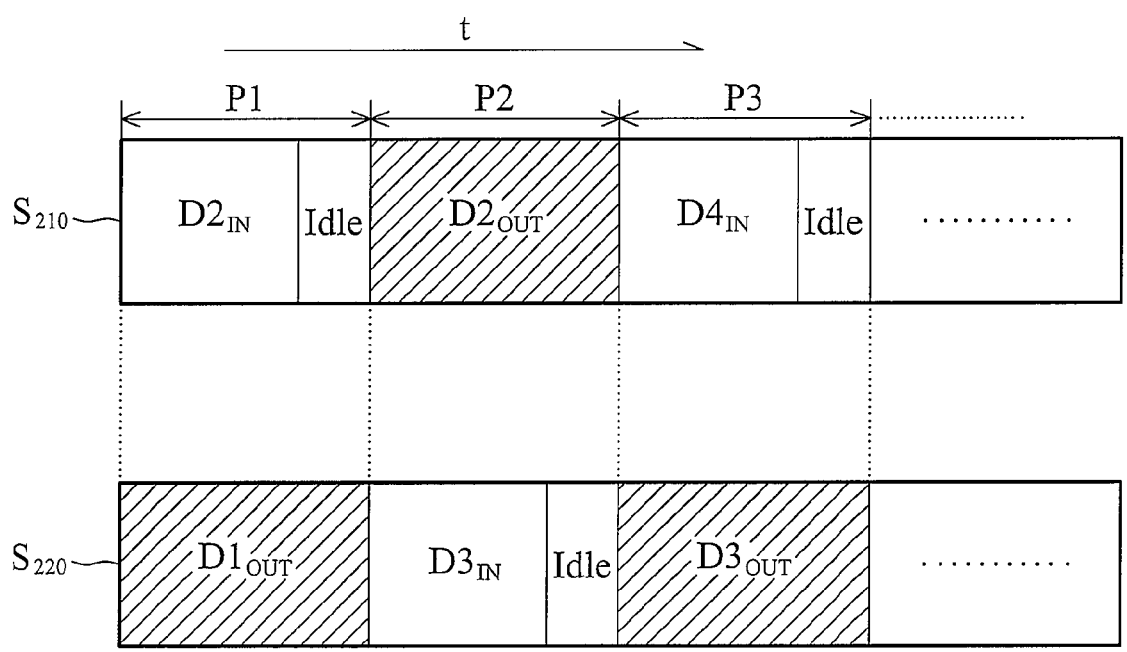
FIG. 3 shows timing diagrams illustrating relative statuses of the ping buffer and pong buffer in normal mode.

FIG. 3 shows timing diagrams illustrating relative statuses of the ping buffer and pong buffer. With reference to the ping buffer 210 and pong buffer 220 shown in FIG. 2a, $S_{210}$ means status of the ping buffer 210 versus time, and $S_{220}$ is the status of pong buffer 220. When in normal mode, the ping buffer 210 and pong buffer 220 cooperate to sequentially buffer and play data blocks acquired from the optical disc 110. In period P1, the pong buffer 220 outputs data block content D1 for play (designated as $D1_{OUT}$), and simultaneously, the ping buffer 210 buffers a data block D2 during period $D2_{IN}$ and idles until the end of period P1. In period P2, the ping buffer 210 outputs the data block D2 during period $D2_{OUT}$, and the pong buffer 220 buffers a data block D3 during period $D3_{IN}$ before entering an idle state until the end of period P2. The operations in successive periods can be likewise inferred. In the embodiment of the invention, it can be observed that in normal mode, the speed to buffer a data block is faster than playing a data block, and this is why the background buffer is directed to enter an idle state to await the foreground buffer to finish the playing.

Figure 4:
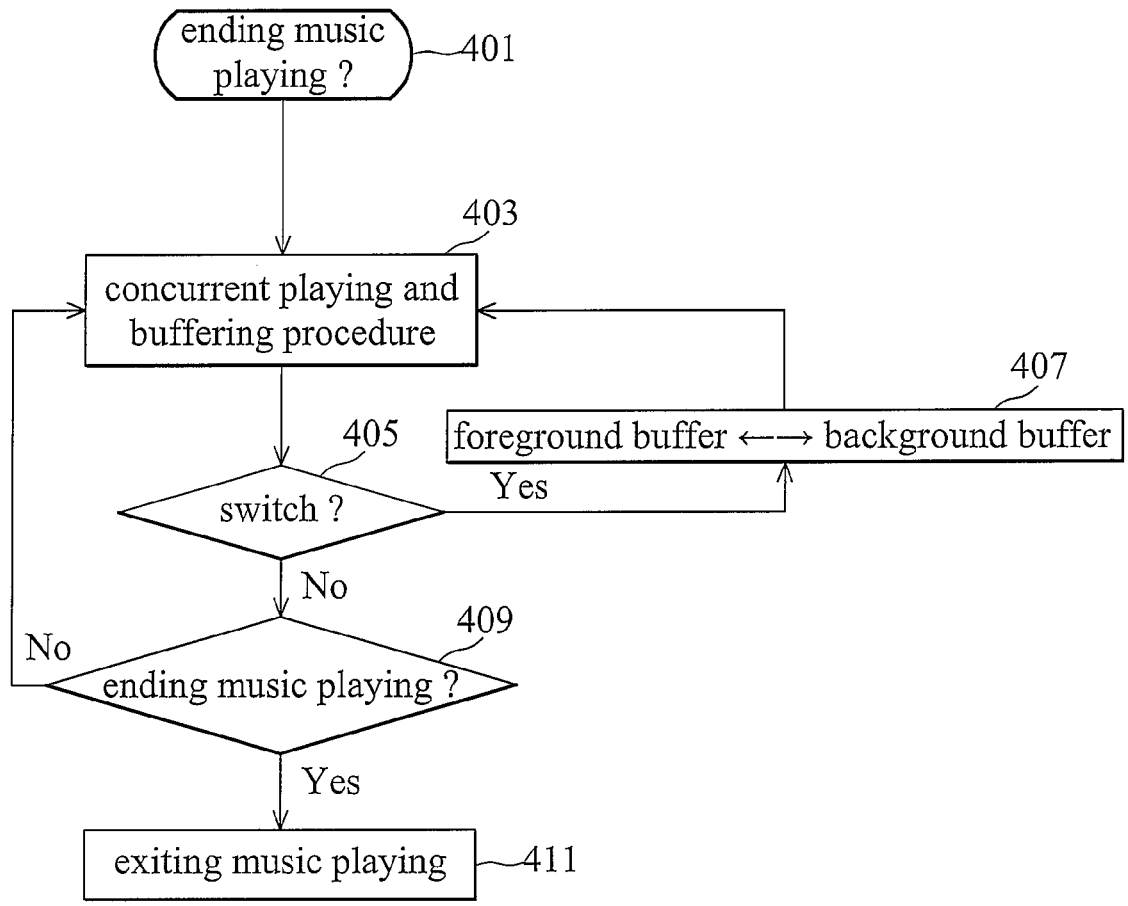
FIG. 4 is a flowchart of concurrent playing and buffering.

FIG. 4 is a flowchart of a concurrent playing and buffering procedure. The flowchart is adaptable for both normal mode and fast rolling mode. In step 401, the optical disc drive 100 is initialized to play the optical disc 110. In step 403, a concurrent buffering and playing procedure utilizing the architectures in FIGS. 2a and 2b is processed, whereby data blocks are decoded into playable music. In step 405, it is determined whether to interchange the foreground and background buffers. When the data block in the foreground buffer is completely played, their places are interchanged in step 407, such that the foreground buffer becomes a background buffer, and vice versa. In step 409, it is determined whether the music playing has finished. If not, the process loops to step 403 to repeat the concurrent buffering and playing. When all audio files are played, the music playing is concluded in step 411.

Figure 5A:
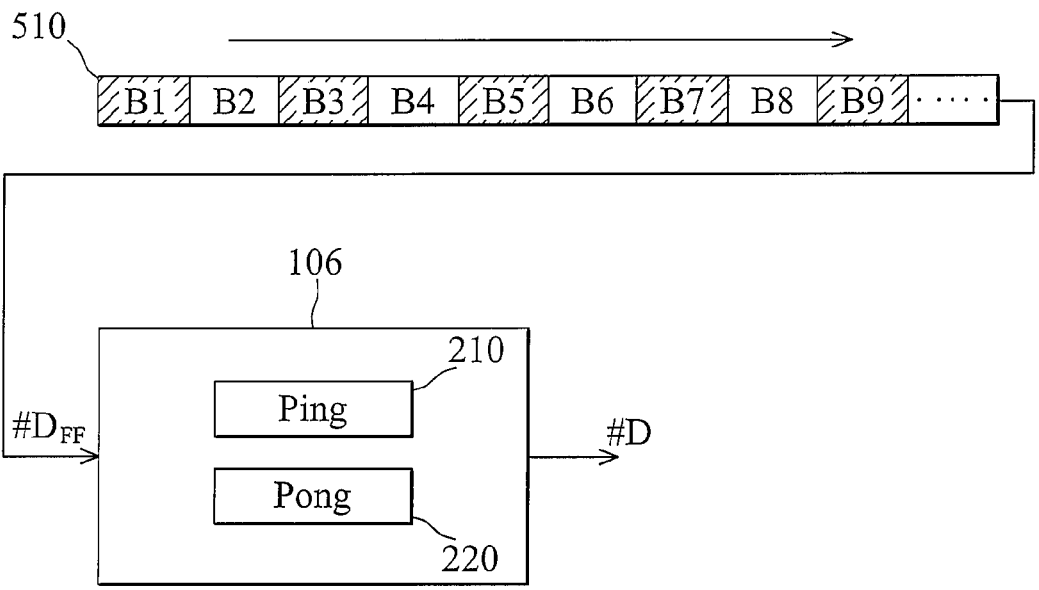
FIGS. 5a and 5b show memory device operating in a fast forward mode and a fast rewind mode.
Figure 5B:
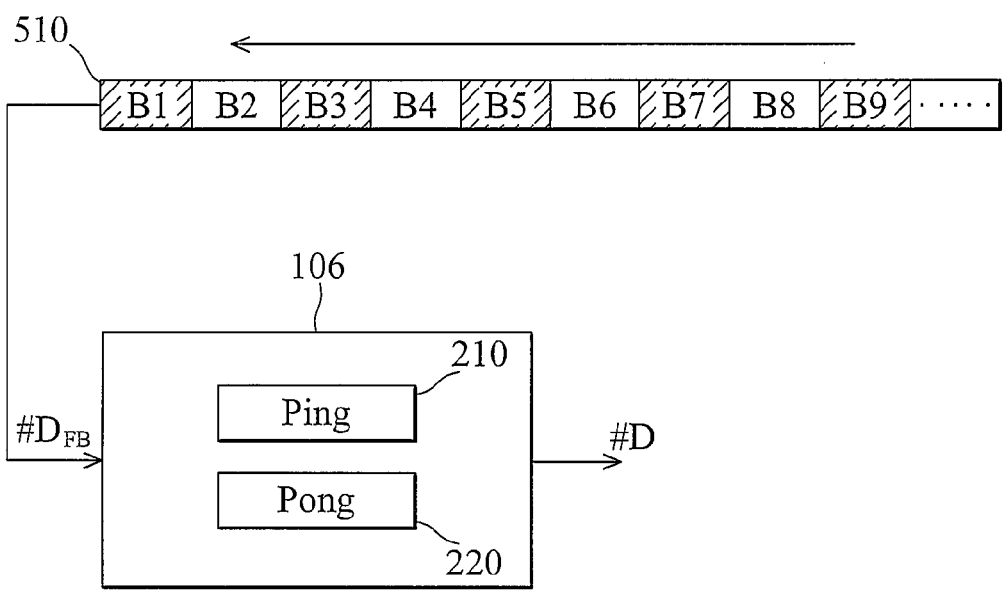

FIGS. 5a and 5b show a memory device operating in a fast forward mode and a fast rewind mode. The fast rolling mode may comprise two types, fast forward and fast rewind. To further clarify the embodiment, the difference between fast rolling mode and normal mode is explained. No matter in normal mode or in fast rolling mode, data transfer rate of disc reading is always at an accelerated rate, and the music play is always at a standard rate. However, the music played in normal mode is continuous, whereas that in fast rolling mode is discrete. In FIG. 5a, data blocks in the optical disc 510 are designated as B1, B2 . . . in an ascending order. In the fast forward mode, the data blocks are not consecutively buffered. One or more data blocks may be skipped every certain interval during reading. For example, when the optical disc 510 is read at a rate of 2× speed, a skipping ratio is defined to be 1:2, which means one out of two data blocks is to be skipped, thus the fast forward data blocks $\#D_{FF}$ buffered by the memory device 106 are B1, B3, B5, B7, B9 and so on. In other words, the skipping ratio may be proportional to the disc reading rate. The music play is proceeded at the standard rate regardless of the skipping ratio, however the music may sound like discontinuous pieces because some frames are skipped. In the embodiment, a fade-in fade-out effect may be implemented to smoothen the music assembled from the discontinuous data blocks B1, B3, B5, B7 and B9.

In FIG. 5b, the fast rewind mode is implemented. If the optical disc 110 is fast rewound at a reading rate of 2× speed, data blocks are buffered in a descending order. Since one data block is skipped every two data blocks, the fast rewind data blocks $\#D_{FB}$ acquired by the memory device 106 are sequentially B9, B7, B5, B3, and B1. The flowchart in FIG. 4 is also adaptable to buffering and playing the fast rewound data blocks, and music pieces are assembled from the sequentially buffered B9, B7, B5, B3 and B1. The fade-in fade-out effect is also adaptable to smoothen the assembled music while playing.

In the embodiment of the invention, practically, time required to buffer a data block is far less than playing the data block, because the data block is read at an accelerated speed and played at a normal rate. However, mechanical operations of a pickup head such as track seeking and locking are time consuming, particularly when the data blocks are accessed discontinuously or reversely. In fast forward mode or with lower skipping ratio, there may not appear to be any difference, but in fast rewind mode or with high skipping ratio, the performance issue is of great concern.

Figure 6:
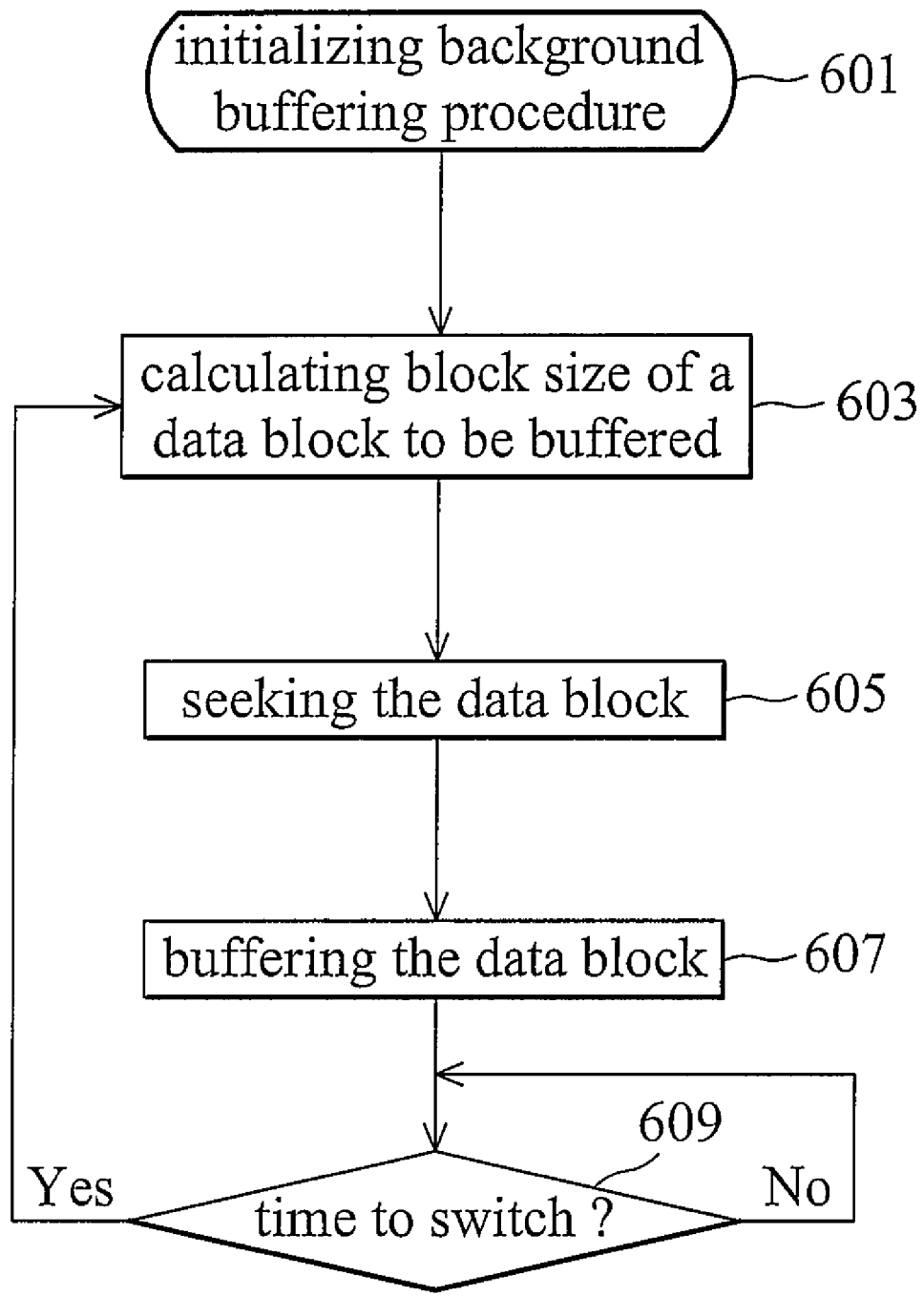
FIG. 6 is a flowchart of a buffering operation.

FIG. 6 is a flowchart of a buffering operation. The buffering operation is always performed on a background buffer while music is played in the foreground. If a data block can not be sought and buffered in time, the background buffer may fail to provide foreground music after function adjusting is performed. In the embodiment, an approach is proposed to assure a foreground buffer provides content of sufficient playback durations to cover the time required to accomplish a background buffering operation. In step 601, the buffering operation is initialized based on the architectures disclosed in FIGS. 2a and 2b. In step 603, a block size calculation is performed before buffering a target data block into the background buffer. Physically, the background buffer will be used as a foreground buffer in a next playing operation, and the block size calculation predicts the amount of contents required in the next playing operation. The details are described in FIG. 7. Because of the aforementioned skipping approach, the target data block may be several sectors or tracks away from the currently buffered data block. A target track and a target sector of the target block are first determined. In step 605, the pickup head is moved to seek the target track, and in step 607, the data block is accessed until the target sector is located. Upon the data block being complete buffered, in step 609, the background buffer idles to await buffer interchange. When music play in the foreground buffer is complete, the foreground and background buffers are interchanged, and the process loops back to step 603, whereby a further block size is predicted for a further playing operation.

A block size defines the amount of contents a next foreground buffer (which is the current background buffer) should possess. In other words, block sizes of the data blocks buffered every period are adjustable. Since the block size is adjustable, a data block may cover one or more sectors. Furthermore, if the contents in the optical disc 110 are compressed music such as MP3 or WMA, the playback duration of a data block is dependent on bit rates of the compressed music.

Figure 7:
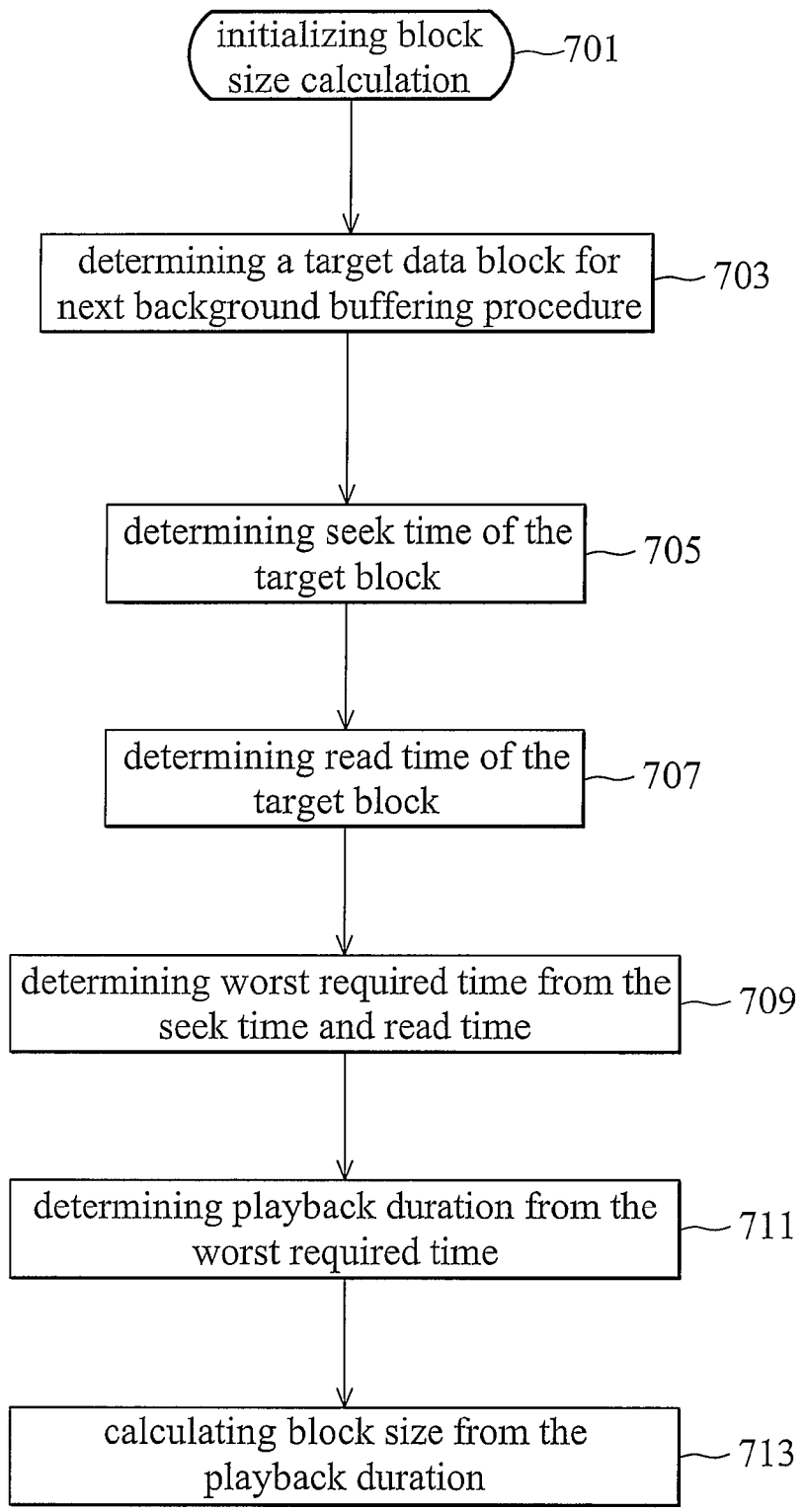
FIG. 7 is a flowchart of block size estimation.

FIG. 7 is a flowchart of block size estimation. In step 701, the block size calculation as described in step 603 is initiated. In step 703, a target data block is scheduled to be buffered based on the skipping ratio and location of the current data block. For the case in FIG. 5a, if the current data block to be buffered is B1, with its block size to be calculated, the next block B3 to be buffered is identified to be the target data block. A target track and a target sector where the data block is located are also determined, with the distance between the data blocks B1 and B3 recorded. The distance may not be an accurate value because data blocks B1 and B3 may comprise one or more sectors, nevertheless, their initial addresses on the optical disc 110 can be used as references. In step 705, a seek time is estimated. The seek time defines a maximum time needed to completely seek for the target data block. Parameters to estimate the seek time comprise the distance between the current data block and the target data block, the target track, the target sector and the skipping ratio. In step 707, read time is estimated. The read time is required when reading the target data block from the optical disc 110 to the buffer. Practically, the size of the target block is currently unknown (which is to be determined during the following buffering operation), and the reading time is relatively short given the skipping ratio, so an average value calculated from the last reading operation can be used instead. In step 709, a worst require time is calculated by adding the seek time and read time. In step 711, a playback duration is decided based on the worst required time, and in step 713, the block size is inferred from the playback duration to ensure enough contents are buffered in the buffering operation. As described, data blocks in the optical disc 110 may be compressed music encoded at a bit rate (bit per second), and the block size is related to multiplication of the playback duration and the bit rate. For example, following is the equation which may be used to calculate the block size (in bytes):

$$S_B = R_B/8 * T_W$$

Where $S_B$ is the block size, $R_B$ is the bit rate and $T_W$ is the playback duration. To assure uninterrupted played music, the playback duration is assessed as being subsequently larger than the worst required time.

Figure 8:
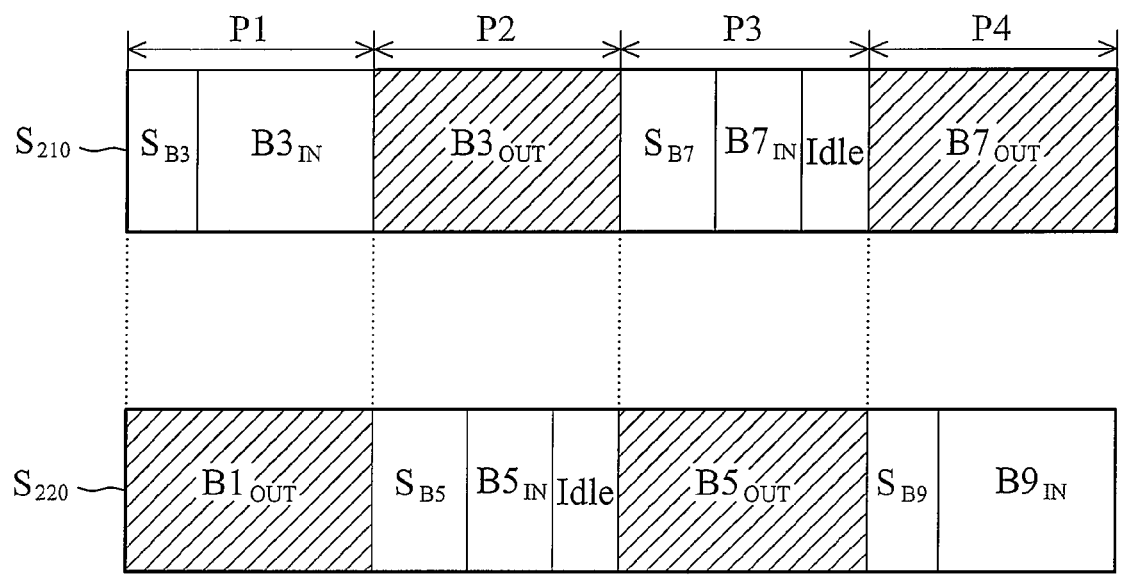
FIG. 8 shows timing diagrams illustrating relative status of the ping buffer and pong buffer in fast rolling mode.

FIG. 8 shows timing diagrams illustrating relative status of the ping buffer and pong buffer in fast forwarding mode as described in FIG. 5a (designated as ping buffer status $S_{210}$ and pong buffer status $S_{220}$ respectively). In period P1, while a data block B1 is played ($B1_{OUT}$), a next data block B3 is buffered ($B3_{IN}$). The playback duration $B3_{OUT}$ of the data block B3 (which is equivalent to the period P2) is dependent on the worst required time to successfully acquire the data block B5 ($S_{B5} + B5_{IN}$) in period P2. In other words, the length of period P2 is proportional to size of the data block B3 acquired in period P1. In period P2, assume the data block B5 is located on a target sector of a target track, the time required to seek the target sector on the track is estimated as $S_{B5}$, and the time required to buffer the data block B5 is also predicted as $B5_{IN}$. Therefore, the period P2 is accordingly determined as subsequently larger than $S_{B5} + B5_{IN}$.

As known, sector times vary from optical discs of different sizes and formats. A sector time is referred to as the time required for a pickup head to move through a sector. For an ordinary compact disc rotating at the standard rate 1×, an average sector time is 1/75 second. Practically, the optical disc is usually rotated at an accelerated rate, so the actual sector is even shorter. On the other hand, a sector time also varies from inner tracks to outer tracks, thus a radial ratio should be considered. The radial ratio may be a current MSF over the maximum MSF of the optical disc 110. In the embodiment, the average sector time of the optical disc 110 is a known value varying with the reading rate. When calculating the access time $S_{B5}$, the target sector where the data block B5 is stored is determined, and a weighted sector time is estimated by weighting the average sector time with the radial ratio. Alternatively, a ratio of the target track versus the total tracks on the optical disc 110 can also be a factor to calculate the weighted sector time. Finally, the time to reach the target sector is estimated based on the weighted sector time.

In period P1, after the block size of B3 is determined, the pickup head seeks the data block B3 during period $S_{B3}$, and buffers the data block B3 into the ping buffer 210 during period $B3_{IN}$. The buffered data block B3, as expected, comprise sufficient contents to be playback for the total period P2. During the Period P2, block size of the data block B5 is calculated based on the worst required time to buffer the data block B7. The data block B5 is then sought during period $S_{B5}$, and buffered during period $B5_{IN}$. A brief idle period may be induced after period $B5_{IN}$ because the playback duration of B3 (designated as $B3_{OUT}$) is destined to be subsequently longer than the total time required by the seeking and buffering operations of the data block B5 ($S_{B5} + B_{5IN}$).

The invention is particularly adaptable to optical disc drives with low-end CPUs since requirements to buffer capacity and computation powers are relatively low. An optical disc drive may be enabled to implement the method by simply upgrading the firmware. Some of the parameters to calculate the worst required time may be calculated once and stored in a cache register, however, the parameters may differ from discs of different formats, and thus the processor 104 may renew the parameters every time a new optical disc 110 is installed. In summary, the invention enables an optical disc drive to play music uninterruptedly while fast forwarding or fast rewinding.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for playing a fast rolling music disc, comprising:

reading the music disc at an accelerated rate to discretely buffer data blocks in a memory device comprising a first buffer and a second buffer;

concurrently playing a first data block stored in the first buffer while buffering a second data block into the second buffer;

when the playing of the first data block concluded, the second data block is played in the second buffer consequentially, and repeating the concurrent playing and buffering step, while a third data block is buffered into the first buffer;

determining a target sector and a target track where the third data block is located, and the third data block which is buffered concurrently while the second data block is played, has a distance from the second data block dependent on a skipping ratio;

estimating a worst required time which allows complete buffering of the third data block based on the distance, the target track, the target sector and the skipping ratio; and allocating a block size of the second data block which provides playback duration subsequently longer than the worst required time;

wherein the steps of determining the target sector and the target track, estimating the worst required time and allocating the block size of the second data block are executed before buffering the second data block; wherein discreteness of the first and second data blocks is dependent on the skipping ratio, and the skipping ratio is dependent on the accelerated rate.

2. The method for playing a fast rolling music disc as claimed in claim 1, wherein the second data block is a compressed media encoded at a bit rate and the block size of the second data block is related to multiplication of the playback duration and the bit rate.

3. The method for playing a fast rolling music disc as claimed in claim 1, wherein determination of the worst required time comprises:

estimating the time required to seek the target track;

calculating an average sector time based on the skipped ratio, wherein the average sector time is the time required by a pickup head to move through a sector;

calculating a weighted sector time by weighting the average sector time with the a ratio of the target track versus the total tracks on the music disc; and estimating the time required to locate the target sector based on the weighted sector time.

4. The method for playing a fast rolling music disc as claimed in claim 3, wherein the second data block played in the second buffer and buffering of the third data block comprises:

seeking of the target track and locating the target sector; and reading the third data block into the first buffer.

5. The method for playing a fast rolling music disc as claimed in claim 1, wherein when the fast rolling music disc is in a fast forward mode, the first, second and third data blocks are in ascending order.

6. The method for playing a fast rolling music disc as claimed in claim 1, wherein when the fast rolling music disc is in a fast rewind mode, the first, second and third data blocks are in descending order.

7. The method for playing a fast rolling music disc as claimed in claim 1, wherein the first, second and third data blocks in the music disc conform to a compressed media format, and playing of the data blocks comprises decoding the data blocks into audio signals and outputting the audio signals for amplification.

8. An optical disc drive, adaptable for playing a fast rolling music disc, comprising:

a driver module used to read the music disc at an accelerated rate;

a memory device, comprising a first buffer and a second buffer, storing data blocks read from the music disc; and a processor, executing a firmware to concurrently play a first data block stored in the first buffer while buffering a second data block into the second buffer, wherein when the playing of the first data block is concluded, the playing and buffering step is concurred by the processor to play the second data block in the second buffer while a third data block is buffered into the first buffer;

wherein discreteness between the first and second data blocks is dependent on a skipping ratio, and the skipping ratio is dependent on the accelerated rate;

the processor further determines a target sector and a target track where the third data block is located, and the third data block which is buffered concurrently while the second data block is played, has a distance from the second data block dependent on the skipping ratio;

the processor further estimates a worst required time which allows complete buffering of the third data block based on the distance, the target track, the target sector and the accelerated rate; and the processor further allocates a block size of the second data block to provide playback duration subsequently longer than the worst required time;

wherein the processor determines the target sector and the target track, the processor estimates the worst required time and the processor allocates the block size of the second data block before buffering the second data block.

9. The optical disc drive as claimed in claim 8, wherein:

the second data block is a compressed media encoded at a bit rate; and the block size of the second data block is related to multiplication of the playback duration and the bit rate.

10. The optical disc drive as claimed in claim 8, wherein:

the processor estimates the time required in seeking of the target track, and calculates an average sector time based on the accelerated rate, where the average sector time is the time required by a pickup head to move through a sector;

the processor calculates a weighted sector time by weighting the average sector time with the a ratio of the target track versus the total tracks on the music disc, and estimates the time required to locate the target sector based on the weighted sector time; and the processor determines the worst required time based on the time required in seeking of the target track and time required to locate the target sector.

11. The optical disc drive as claimed in claim 10, wherein while the second data block is played in the second buffer, the processor seeks the optical disc for the target track and the target sector, and reads the third data block into the first buffer.

12. The optical disc drive as claimed in claim 8, wherein the optical disc drive is in a fast forward mode, and the first, second and third data blocks are in ascending order.

13. The optical disc drive as claimed in claim 8, wherein the optical disc drive is in a fast rewind mode, and the first, second and third data blocks are in descending order.

14. The optical disc drive as claimed in claim 8, wherein:

the data blocks conform to a compressed media format; and when playing of the data blocks, the processor decodes the first, second and third data blocks into audio signals and outputs the audio signals for amplification.

* * * * *